US011233830B2

(12) United States Patent
Yale et al.

(10) Patent No.: US 11,233,830 B2
(45) Date of Patent: Jan. 25, 2022

(54) SYSTEMS AND METHODS FOR POINT-TO-POINT ENCRYPTION COMPLIANCE

(71) Applicant: VeriFone, Inc., San Jose, CA (US)

(72) Inventors: Scott Raymond Yale, El Cajon, CA (US); Joachim Vance, Arroyo Grande, CA (US)

(73) Assignee: VERIFONE, INC., Wilmington, DE (US)

( * ) Notice: Subject to any disclaimer, the term of this patent is extended or adjusted under 35 U.S.C. 154(b) by 149 days.

(21) Appl. No.: 15/982,434

(22) Filed: May 17, 2018

(65) Prior Publication Data

US 2019/0319989 A1 Oct. 17, 2019

Related U.S. Application Data

(60) Provisional application No. 62/657,294, filed on Apr. 13, 2018.

(51) Int. Cl.
*H04L 29/06* (2006.01)
*G06F 21/60* (2013.01)
*G06Q 20/34* (2012.01)
*G06Q 20/38* (2012.01)
*G07F 7/10* (2006.01)

(52) U.S. Cl.
CPC .......... *H04L 63/205* (2013.01); *G06F 21/602* (2013.01); *G06Q 20/3567* (2013.01); *G06Q 20/3821* (2013.01); *G07F 7/1016* (2013.01)

(58) Field of Classification Search
CPC . H04L 63/205; G06F 21/602; G06Q 20/3567; G06Q 20/3821

USPC .......................................................... 726/1
See application file for complete search history.

(56) References Cited

U.S. PATENT DOCUMENTS

| 6,679,427 B1 | 1/2004 | Kuroiwa |
| 6,961,000 B2 * | 11/2005 | Chung ............... G06K 7/10346 340/572.1 |
| 9,330,383 B1 * | 5/2016 | Vadera ................... G06Q 20/38 |

(Continued)

FOREIGN PATENT DOCUMENTS

WO 2008144555 11/2018

OTHER PUBLICATIONS

Extended European Search Report, dated Jul. 9, 2019, from corresponding European Patent Application No. 19168975.1.

(Continued)

*Primary Examiner* — Dant B Shaifer Harriman
(74) *Attorney, Agent, or Firm* — Bond, Schoeneck & King, PLLC

(57) ABSTRACT

Systems and methods for point-to-point encryption compliance are disclosed. In one embodiment, in a point of interaction device comprising at least one computer processor, a method for point-to-point encryption compliance may include: (1) receiving card data from a card reading device; (2) determining an error with the card data; (3) generating substitute data by replacing at least a portion of the card data with substitute data; and (4) communicating the substitute data to a payment server. The card data may be received from a magnetic stripe reader, from an EMV card reader, or from a contactless card reader. The error may include comprises the card data not being compliant with ISO-7813.

17 Claims, 2 Drawing Sheets

(56) References Cited

U.S. PATENT DOCUMENTS

| | | | | |
|---|---|---|---|---|
| 9,373,111 | B2* | 6/2016 | Wagner | G06Q 20/382 |
| 10,296,910 | B1* | 5/2019 | Templeton | G06Q 20/4014 |
| 10,475,024 | B1* | 11/2019 | Behren | G06Q 20/3829 |
| 11,023,878 | B1* | 6/2021 | Hernandez | H04W 40/20 |
| 2006/0049256 | A1* | 3/2006 | von Mueller | G06Q 20/40975 |
| | | | | 235/449 |
| 2007/0262138 | A1* | 11/2007 | Somers | G06Q 20/40975 |
| | | | | 235/380 |
| 2008/0091944 | A1* | 4/2008 | von Mueller | G06F 21/606 |
| | | | | 713/168 |
| 2013/0212025 | A1* | 8/2013 | Tanner | G06Q 20/401 |
| | | | | 705/71 |
| 2015/0041534 | A1* | 2/2015 | Rayner | G06Q 20/327 |
| | | | | 235/380 |
| 2015/0161596 | A1* | 6/2015 | McCarthy | G06Q 20/204 |
| | | | | 705/67 |
| 2016/0239835 | A1* | 8/2016 | Marsyla | G06Q 20/3829 |
| 2017/0149739 | A1* | 5/2017 | Hull, IV | G06Q 20/00 |
| 2017/0300892 | A1* | 10/2017 | Fukuda | G06Q 20/405 |
| 2020/0097960 | A1* | 3/2020 | Wong | G06Q 20/322 |

OTHER PUBLICATIONS

Communication pursuant to Article 94(3) EPC, dated Dec. 11, 2020, from corresponding European Patent Application No. 19168975.1, pp. 1-6.

* cited by examiner

SYSTEMS AND METHODS FOR POINT-TO-POINT ENCRYPTION COMPLIANCE

RELATED APPLICATIONS

This application claims priority to U.S. Provisional Patent Application No. 62/657,294, filed Apr. 13, 2018. The disclosure of this document is hereby incorporated, by reference, in its entirety.

BACKGROUND OF THE INVENTION

1. Field of the Invention

The present disclosure relates generally to input devices, and more particularly to systems and methods for point-to-point encryption compliance.

2. Description of the Related Art

For a point of interaction device, such as a point of sale device, to be compliant with PCI Security Standards Council, LLC's point-to-point encryption (P2PE) security requirements, a payment application executed by the point of interaction device must never send clear-text account data outside of a PCI approved point of interaction (POI) device. If payment card data cannot be encrypted (e.g., the data was the result of a bad swipe or read, it is a non ISO-7813 compliant card, the card is not a payment card, etc.), there is a risk that some data may be provided to the payment application in the clear. If the payment application does not know that this data is not encrypted, the payment application could transmit unencrypted data.

SUMMARY OF THE INVENTION

Systems and methods for point-to-point encryption compliance are disclosed. In one embodiment, in a point of interaction device comprising at least one computer processor, a method for point-to-point encryption compliance may include: (1) receiving card data from a card reading device; (2) determining an error with the card data; (3) generating substitute data by replacing at least a portion of the card data with substitute data; and (4) communicating the substitute data to a payment server.

In one embodiment, the card data may be received from a magnetic stripe reader, from an EMV card reader, or from a contactless card reader.

In one embodiment, the error comprises the card data not being compliant with ISO-7813.

In one embodiment, the substitute data may include static data, random data, etc. In one embodiment, the substitute data may include an indicator of the error.

In one embodiment, the method may further include retrieving a security packet for the transaction; and communicating the security packet and the substitute data to the authorization platform.

In one embodiment, the point of interaction device may be a point of sale device.

According to another embodiment, a point of interaction device, may include a card reading device and a cryptographic processor. The cryptographic processor may receive card data from the card reading device, determine an error with the card data, and generate substitute data by replacing at least a portion of the card data with the substitute data.

In one embodiment, the point of interaction device may communicate the substitute data to a payment server.

In one embodiment, the card data may be received from a magnetic stripe reader, from an EMV card reader, or from a contactless card reader.

In one embodiment, the error comprises the card data not being compliant with ISO-7813.

In one embodiment, the substitute data may include static data, random data, etc. In one embodiment, the substitute data may include an indicator of the error.

In one embodiment, the point of interaction device may retrieve a security packet for the transaction and may communicate the security packet and the substitute data to the authorization platform.

In one embodiment, the point of interaction device may be a point of sale device.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
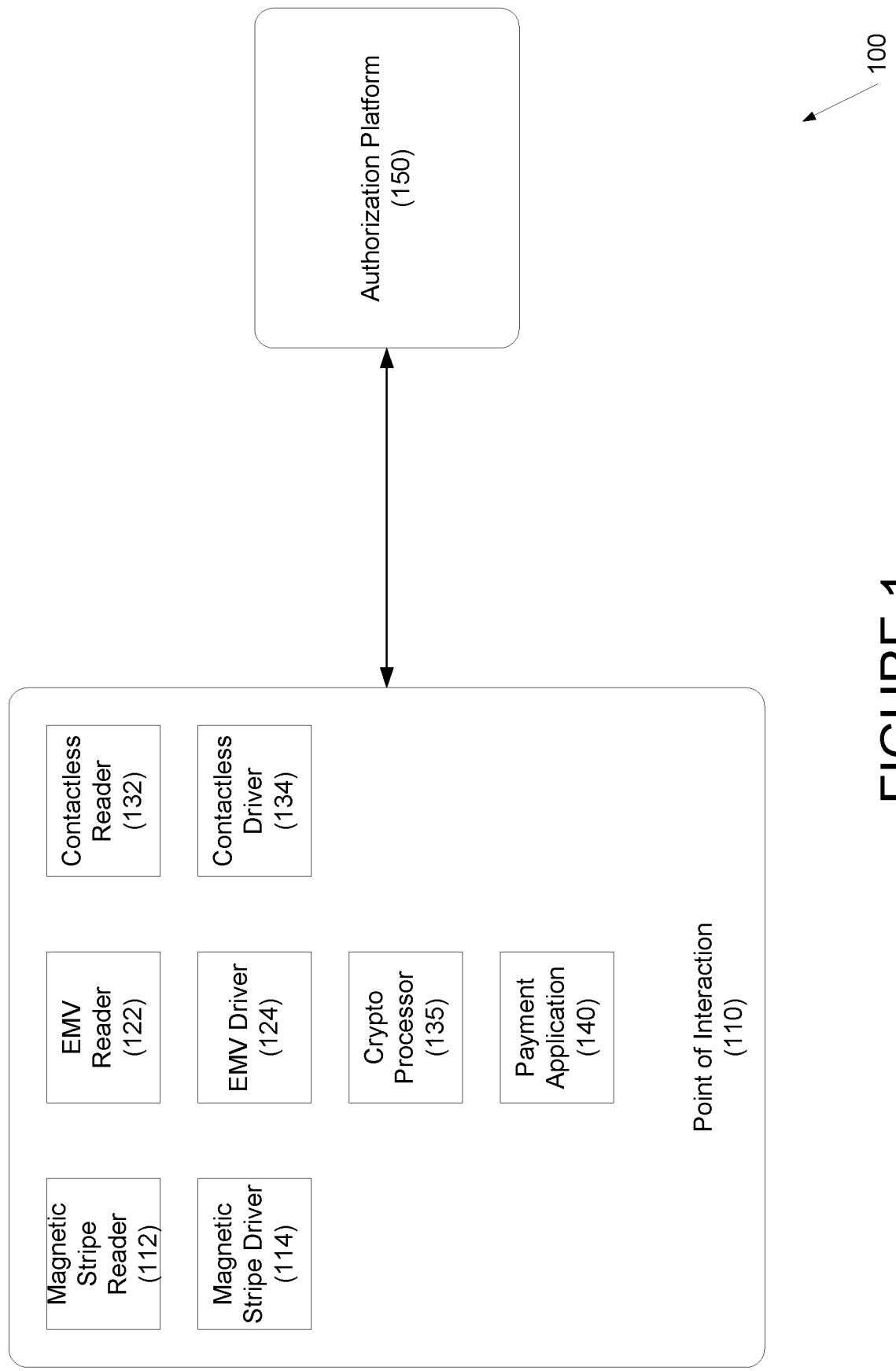
FIG. 1 depicts a system for point-to-point encryption compliance according to one embodiment.
Figure 2:
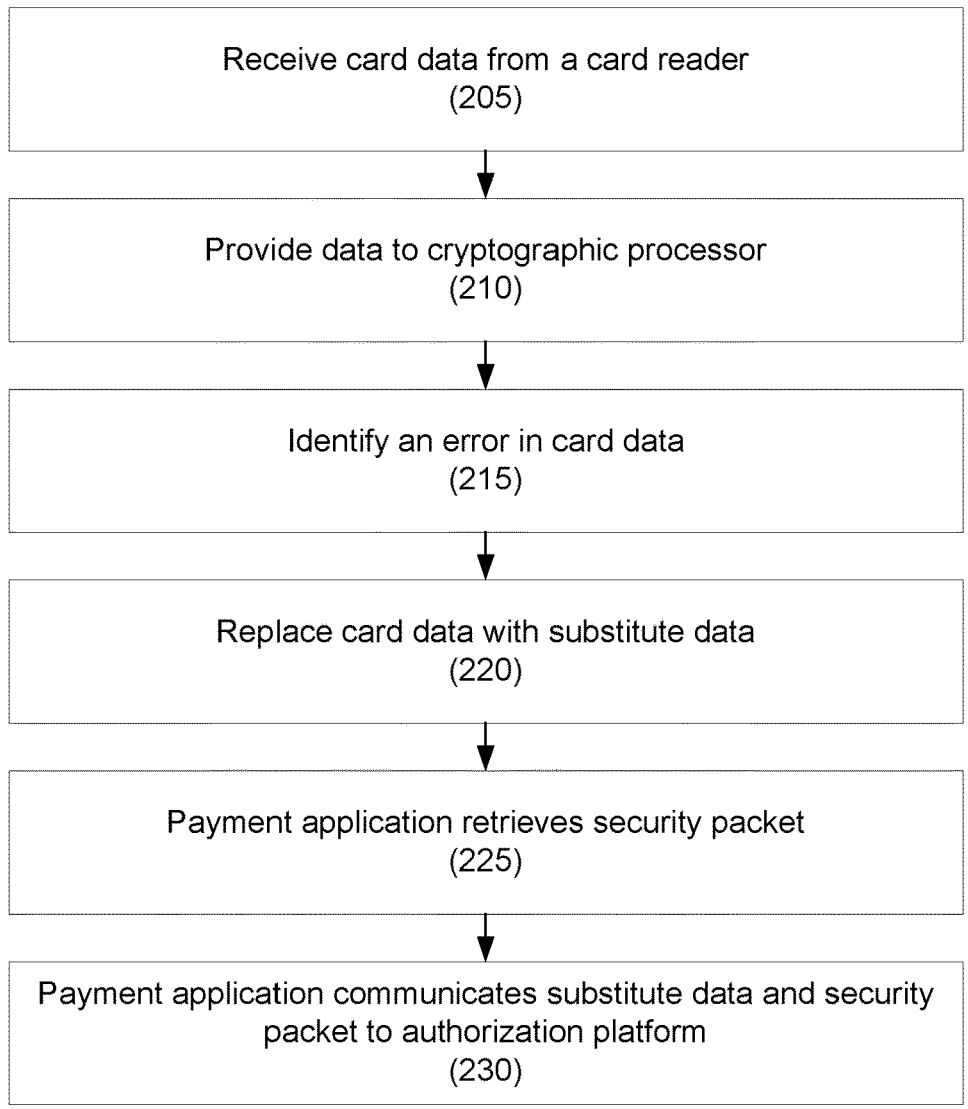
FIG. 2 depicts a method for point-to-point encryption compliance according to one embodiment.

Several embodiments of the present invention and their advantages may be understood by referring to FIGS. 1-2.

Embodiments are directed to systems and methods for point-to-point encryption compliance.

Referring to FIG. 1, a system for point-to-point encryption compliance is disclosed according to one embodiment. System 100 may include point of interaction device, which may be any suitable point of sale device. Point of interaction device 110 may include magnetic stripe reader 112 and magnetic stripe driver 114 for reading and processing magnetic stripe data from a payment card. This data may include, for example, Track I and Track II data. Point of interaction device 110 may further include EMV reader 122 and EMV driver 124 for reading and processing EMV data from an EMV-enabled (i.e., chip) payment card. In one embodiment, the data from the EMV-enabled payment card may not be in a Track I and Track II format, so EMV driver 124 may format the data from the EMV-enabled payment card to be in that format.

Point of interaction device 110 may further include contactless reader 132 and contactless driver 134 for reading and processing contactless data from a contactless-enabled payment card, an electronic device (e.g., smartphone, Internet of Things (IoT) appliance, etc.), a fob, etc. If necessary, in one embodiment, the data received from contactless reader 132 may not be in a Track I and Track II format, so contactless driver 134 may format the data to be in that format.

Point of interaction device 110 may further include cryptographic processor 135, which may receive and process data from magnetic stripe driver 114, EMV driver 124, and contactless driver 134.

In one embodiment, magnetic stripe reader 112 and driver 114, EMV reader 122 and driver 124, and contactless reader 132 and driver 134, cryptographic processor 135, and payment application 140 may be in the same point of interaction device. In one embodiment, any or all of magnetic stripe reader 112 and driver 114, EMV reader 122 and driver 124, and contactless reader 132 and driver 134 may be located externally from point of interaction device.

In one embodiment, after cryptographic processor 135 receives data from magnetic stripe driver 114 or EMV driver 124, cryptographic processor 135 may analyze the data to determine if it there is an error. For example, cryptographic processor may determine if the card data is compliant with a standard, such as ISO-7813. If there is not an error (e.g., the card data is compliant), it may then encrypt the data, return the data to magnetic stripe driver 114, EMV driver 124, or contactless driver 134, depending on the source of the data. In another embodiment, cryptographic processor 135 may provide the encrypted data to payment application 140, and payment application 140 may then communicate the encrypted data to authorization platform 150.

If, however, there is an error (e.g., the data is not compliant with ISO-7813 or is otherwise not acceptable), cryptographic processor 135 may take an action that prevents payment application 140 from transmitting unencrypted data to authorization platform 150. For example, in one embodiment, cryptographic processor 135 may generate substitute data by replacing some or all of the card data with substitute data. In one embodiment, the substitute data may include static data that may indicate that there was an error (e.g., a data read error, non-compliant card, etc.).

An example of static data that may be returned is:

Track 1: % B4444440000004444^CARD/INVALID ISO ^44041010000000?c

Track 2: ;4444440000004444=44041010000000?=

In this embodiment, the static data does not include any card information, and conveys the error.

In another embodiment, the substitute data may include random data. Cryptographic processor 135 may also include an indication that there was an error (e.g., a data read error, non-ISO compliant card, etc.).

Other information, such as terminal information, merchant information, BIN information (if available), etc. may be included in the data as is necessary and/or desired. Alternatively, this information may be included in the security packet, or in an additional packet as is necessary and/or desired.

Point of interaction device 110 may further include payment application 140, which may receive encrypted data from magnetic stripe driver 114, EMV driver 124, or contactless driver 136, or from cryptographic processor 135, and may communicate the encrypted data to authorization platform 150. In one embodiment, payment application 140 may append a security packet to the data. In one embodiment, the security packet may include a cryptogram for the payment card data and additional information. The security packet may further include identifying information for the point of interaction device (e.g., serial number), an encryption failure reason code (if applicable), and any additional information as is necessary and/or desired.

In another embodiment, payment application 140 may receive card data from magnetic stripe reader 112, EMV reader 122, or contactless reader 132, or from magnetic stripe driver 114, EMV driver 124, or contactless driver 134 and may then call cryptographic processor 135 to encrypt the card data or return encrypted or substitute data.

Referring to FIG. 2, a method for point-to-point encryption compliance is disclosed according to one embodiment.

In step 205, a point of interaction may receive card data from a card reader. In one embodiment, card data may be received from a magnetic stripe reader. In another embodiment, the card data may be EMV data that may be received from an EMV reader. In another embodiment, the card data may be contactless data that may be received from a contactless reader.

In one embodiment, if necessary, any processing (e.g., conversion or formatting of EMV data to Track I and Track II data) may be performed by, for example, a driver for the card reader.

In step 210, the card data may be provided to a cryptographic processor.

In step 215, the cryptographic processor may identify an error with the card data. For example, the card data may not be in compliance with a standard (e.g., ISO-7813), may be incomplete, etc.

In step 220, the cryptographic processor may replace at least some of the card data with substitute data, and return the substitute data to a payment application. For example, as discussed above, the cryptographic processor may replace some or all of the data with static data that may indicate that there was an error (e.g., a data read error, non-compliant card, etc.). In another embodiment, the cryptographic processor may replace some or all of the data with random data.

Other information, such as terminal information, merchant information, BIN information (if available), etc. may be included in the data as is necessary and/or desired. Alternatively, this information may be included in the security packet, or in an additional packet as is necessary and/or desired.

In step 225, the payment application may optionally retrieve the security packet for the card, and in step 230, the payment application may communicate the substitute data and the security packet (if retrieved) to an authorization platform. The authorization platform may troubleshoot the problem to identify whether it is a card issue, a point of interaction issue, etc.

In one embodiment, automated actions, such as pushing a software update to the point of interaction, informing the issuer or cardholder that the card or token is defective, etc. may be taken as is necessary and/or desired.

In one embodiment, the point of interaction and/or the authorization platform may log the error and any associated information for future retrieval. For example, the error and any associated information may be stored on the point of interaction device, at the authorization platform, in the cloud, etc.

It will be appreciated by persons skilled in the art that the present invention is not limited by what has been particularly shown and described hereinabove. Rather the scope of the present invention includes both combinations and subcombinations of features described hereinabove and variations and modifications thereof which are not in the prior art. It should further be recognized that these embodiments are not exclusive to each other.

It will be readily understood by those persons skilled in the art that the embodiments disclosed here are susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described in detail in relation to its exemplary embodiments, it is to be understood that this disclosure is only illustrative and exemplary of the present invention and is made to provide an enabling disclosure of the invention.

Accordingly, the foregoing disclosure is not intended to be construed or to limit the present invention or otherwise to exclude any other such embodiments, adaptations, variations, modifications or equivalent arrangements.

What is claimed is:

1. A method for point-to-point encryption compliance, comprising:
   in a point of interaction device comprising at least one computer processor:
      receiving a message comprising unencrypted card data for a payment card from a card reading device;
      identifying an error in the unencrypted card data, wherein the error comprises the unencrypted card data being noncompliant with a standard format or the unencrypted card data being incomplete;
      replacing the unencrypted card data in the message with substitute data identifying the error in the unencrypted card data; and
      communicating the message comprising the substitute data to a payment server.

2. The method of claim 1, wherein the unencrypted card data is received from a magnetic stripe reader.

3. The method of claim 1, wherein the unencrypted card data is received from an EMV card reader.

4. The method of claim 1, wherein the unencrypted card data is received from a contactless card reader.

5. The method of claim 1, wherein the standard format is ISO-7813.

6. The method of claim 1, wherein the substitute data further comprises static data.

7. The method of claim 1, wherein the substitute data further comprises random data.

8. The method of claim 1, further comprising:
   retrieving a security packet for a transaction involving the message; and
   communicating the security packet and the substitute data to an authorization platform.

9. The method of claim 1, wherein the point of interaction device is a point of sale device.

10. A point of interaction device, comprising:
    a card reading device; and
    a cryptographic processor;
    wherein:
       the cryptographic processor receives a message comprising unencrypted card data for a payment card from the card reading device;
       the cryptographic processor identifies an error in the unencrypted card data, wherein the error comprises the unencrypted card data being noncompliant with a standard format or the unencrypted card data being incomplete;
       the cryptographic processor replaces the unencrypted card data in the message with substitute data identifying the error in the unencrypted card data; and
       the cryptographic processor communicates the message comprising the substitute data to a payment server.

11. The point of interaction device of claim 10, wherein the unencrypted card data is received from a magnetic stripe reader.

12. The point of interaction device of claim 10, wherein the unencrypted card data is received from an EMV card reader.

13. The point of interaction device of claim 10, wherein the unencrypted card data is received from a contactless card reader.

14. The point of interaction device of claim 10, wherein the standard format is ISO-7813.

15. The point of interaction device of claim 10, wherein the substitute data further comprises static data.

16. The point of interaction device of claim 10, wherein the substitute data further comprises random data.

17. The point of interaction device of claim 10, wherein the point of interaction device retrieves a security packet for a transaction involving the message and communicates the security packet and the substitute data to an authorization platform.

* * * * *